United States Patent
Cruz et al.

(10) Patent No.: US 8,607,345 B1
(45) Date of Patent: Dec. 10, 2013

(54) METHOD AND APPARATUS FOR GENERIC MALWARE DOWNLOADER DETECTION AND PREVENTION

(75) Inventors: Marvin U Cruz, Bulacan (PH); Joseph Cepe, Manila (PH); Marilyn Melliang, Manila (PH); Doris Iquin Pagauitan, Cagayan (PH)

(73) Assignee: Trend Micro Incorporated, Tokyo (JP)

( * ) Notice: Subject to any disclaimer, the term of this patent is extended or adjusted under 35 U.S.C. 154(b) by 832 days.

(21) Appl. No.: 12/336,286

(22) Filed: Dec. 16, 2008

(51) Int. Cl.
*G06F 12/14* (2006.01)
(52) U.S. Cl.
USPC .................. 726/23; 726/22; 726/24; 726/25
(58) Field of Classification Search
USPC ..................................................... 726/22–25
See application file for complete search history.

(56) References Cited

U.S. PATENT DOCUMENTS

| | | | |
|---|---|---|---|
| 6,772,345 B1 | 8/2004 | Shetty | |
| 7,287,279 B2 | 10/2007 | Bertman et al. | |
| 7,392,544 B1 | 6/2008 | Pavlyushchik | |
| 7,401,359 B2 | 7/2008 | Gartside et al. | |
| 7,472,420 B1* | 12/2008 | Pavlyushchik | 726/24 |
| 7,483,993 B2* | 1/2009 | Nachenberg et al. | 709/229 |
| 7,484,097 B2* | 1/2009 | Steiger et al. | 713/176 |
| 7,484,247 B2 | 1/2009 | Rozman et al. | |
| 7,712,132 B1* | 5/2010 | Ogilvie | 726/22 |
| 7,904,573 B1* | 3/2011 | Nachenberg et al. | 709/229 |
| 8,201,243 B2* | 6/2012 | Boney | 726/22 |
| 2003/0088680 A1* | 5/2003 | Nachenberg et al. | 709/229 |
| 2007/0250928 A1* | 10/2007 | Boney | 726/24 |
| 2008/0141371 A1* | 6/2008 | Bradicich et al. | 726/23 |
| 2009/0019547 A1* | 1/2009 | Palliyil et al. | 726/25 |

OTHER PUBLICATIONS

Wikipedia article for "Windows Explorer" as published on Dec. 12, 2007 (7 pages) http://en.wikipedia.org/w/index.php?title=Windows_Explorer&oldid=177526568.*
Wikipedia article for "Trojan horse (computing)" as published Dec. 4, 2008 (3 pages) http://en.wikipedia.org/w/index.php?title=Trojan_horse_(computing)&oldid=255868537.*
Transcript of "Security Now!" podcast #38: "Browser Security" featuring Leo Laporte and Steve Gibson, originally airing on May 4, 2006 (13 pages) Transcript: http://www.grc.com/sn/sn-038.pdf Audio: http://twit.tv/sn38.*
"Trojan.LinkOptimizer" article from Symantec.com published Feb. 10, 2007 as verified by the Internet Archive (3 pages) http://web.archive.org/web/20070210145849/http://www.symantec.com/security_response/writeup.jsp?docid=2006-082416-2803-99.*

(Continued)

*Primary Examiner* — Darren B Schwartz
*Assistant Examiner* — Thomas Gyorfi
(74) *Attorney, Agent, or Firm* — Okamoto & Benedicto LLP

(57) ABSTRACT

One embodiment relates to a computer-implemented method of detecting a malware downloader running on a computer system. An indication is received that a process running on the computer system is attempting to execute an executable file. A timestamp of the executable file is obtained. The timestamp indicates a time at which the executable file was downloaded. A current time is also obtained from the computer system. A determination is made as to whether the current time is approximately equal to the time indicated by the timestamp. An indication is made that said process is not a malware downloader if the current time is not approximately equal to the time indicated by the timestamp. Another embodiment relates to a computer apparatus configured to detect a malware downloader. Other embodiments, aspects and features are also disclosed.

16 Claims, 3 Drawing Sheets

(56) References Cited

OTHER PUBLICATIONS

Mah, Paul. "The Italian Job: New browser-based attack" Published Jun. 20, 2007 (1 page) http://www.techrepublic.com/blog/tech-news/the-italian-job-new-browser-based-attack/694.*

Niels Provos; Dean McNamee; Panayiotis Mavrommatis; Ke Wang; Nagendra Modadugu (Apr. 10, 2007). "The ghost in the browser: analysis of web-based malware". HotBots'07. Cambridge, MA: USENIX (9 pages) http://www.usenix.org/events/hotbots07/tech/full_papers/provos/provos.pdf.*

"Viruses, Worms, Trojans, and How to Protect Your Computer!" © 2007 Consumer Fraud Reporting.org (Publication date of Dec. 12, 2007 verified by the Internet Archive) (3 pages) http://web.archive.org/web/20071212212036/http://www.consumerfraudreporting.org/viruses.php.*

"Internet Explorer Developer Center: Internet Explorer Architecture" Article published as of Oct. 16, 2008 as verified by the Internet Archive. © 2008 Microsoft Inc. (4 pages) http://web.archive.org/web/20081016224209/http://msdn.microsoft.com/en-us/library/aa741312.aspx.*

* cited by examiner

METHOD AND APPARATUS FOR GENERIC MALWARE DOWNLOADER DETECTION AND PREVENTION

BACKGROUND OF THE INVENTION

1. Field of the Invention

The present invention relates generally to data processing, and more particularly but not exclusively to scanning of data for malicious content.

2. Description of the Background Art

Today, the World Wide Web or Web has become a critical aspect to the day-to-day activities of people from different walks of life. The Web has evolved from a mere tool used for sharing information into a powerful medium where users can advertise products or services, make social networks, and perform business transactions, among other uses.

Unfortunately, even malicious hackers and cybercriminals are taking advantage of the power of the Web, making the Web a popular vector or avenue of choice for delivering malicious code to unsuspecting computer users. Such malicious code may be delivered by a malware downloader.

A malware downloader is a small malicious program that is used during an initial phase of a web-threat attack. The malware downloader serves primarily to download and execute additional malware components of an infecting system. Malware downloaders are typically placed on an unsuspecting user's computer system by way of compromised web sites. Compromised web sites generally use social engineering and recently-discovered system vulnerabilities to automatically place a malware downloader onto a user's computer system.

SUMMARY

One embodiment relates to a computer-implemented method of detecting a malware downloader running on a computer system. An indication is received that a process running on the computer system is attempting to execute an executable file. A timestamp of the executable file is obtained. The timestamp indicates a time at which the executable file was downloaded. A current time is also obtained from the computer system. A determination is made as to whether the current time is approximately equal to the time indicated by the timestamp. An indication is made that said process is not a malware downloader if the current time is not approximately equal to the time indicated by the timestamp. Another embodiment relates to a computer apparatus configured to detect a malware downloader. Other embodiments, aspects and features are also disclosed.

DETAILED DESCRIPTION

Conventional anti-malware products protect their users' systems by using signature-based (pattern-based) detection. Such signature-based detection checks files on a user's computer system for a possible match with a signature of a malicious file. One problem with the signature-based approach of anti-malware products is that the products need to frequently update their databases of malicious signatures. Such frequent updating is needed to keep up with the growing number of malware variants created by malware writers (hackers). Another problem with the signature-based approach is that, as the number of malware programs is constantly on the rise, the database of malicious signatures increases in file size. Maintaining a large signature database consumes substantial network bandwidth and hard drive space during deployment to users.

Another approach currently in use involves URL-filtering and blocking. This approach blocks predetermined malicious URLs (universal resource locators). These malicious URLs have been determined to be sites where malware is likely to be downloaded. One problem with this approach is that one needs to manually identify and classify (or re-classify) URLs to check if they are really being utilized to download malware. In addition, the database of malicious URLs needs to be kept up-to-date.

The above-discussed conventional approaches are inadequate and/or ineffective in addressing the methods by which web threats are delivered. In contrast, the present application discloses a pattern-less technique for effectively detecting malicious web downloads.

Figure 1:
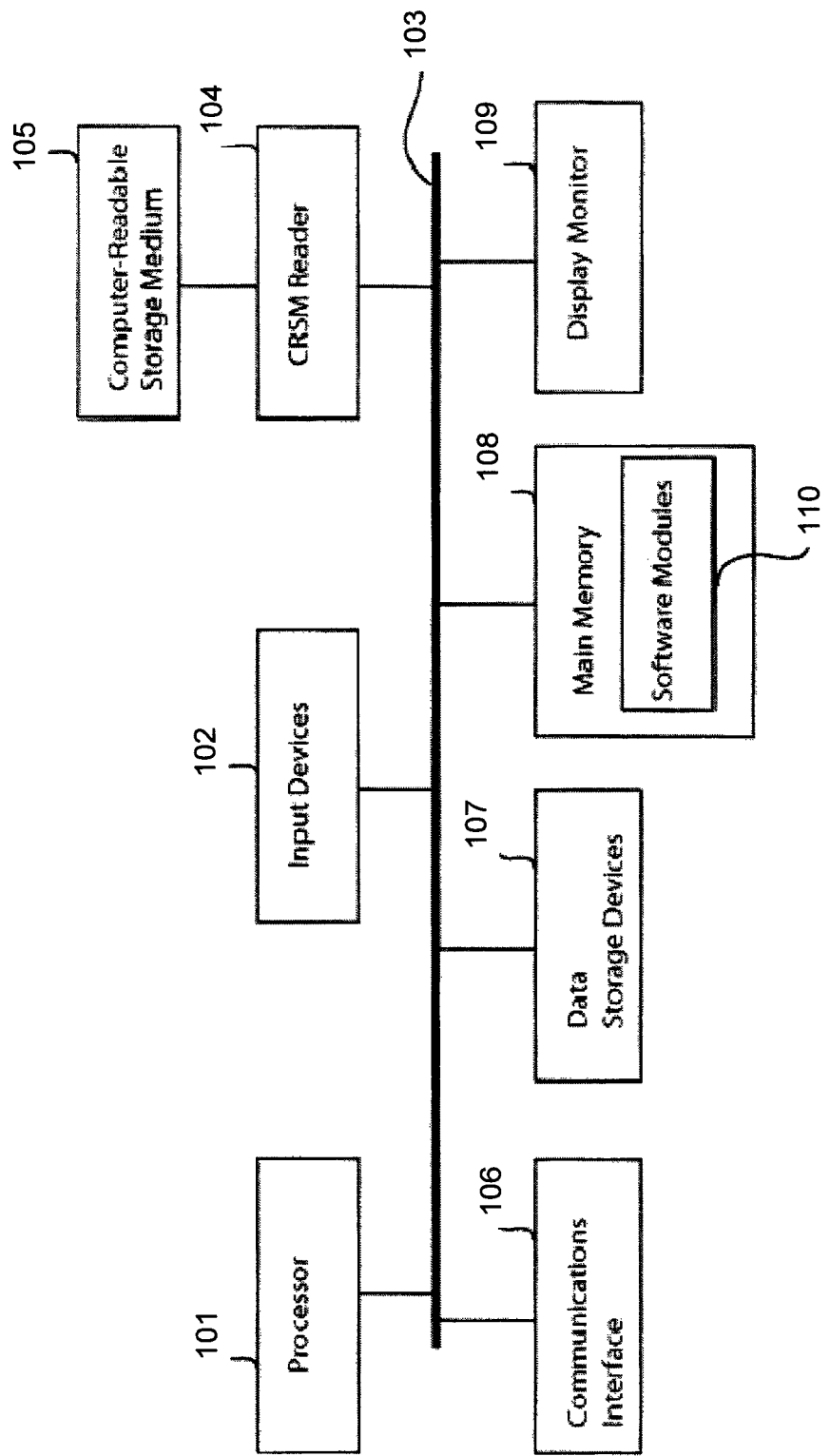
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes software modules 110, which may comprise software components of later described support server computers and customer client computers. The software modules 110 may be executed by processor 101.

Figure 2:
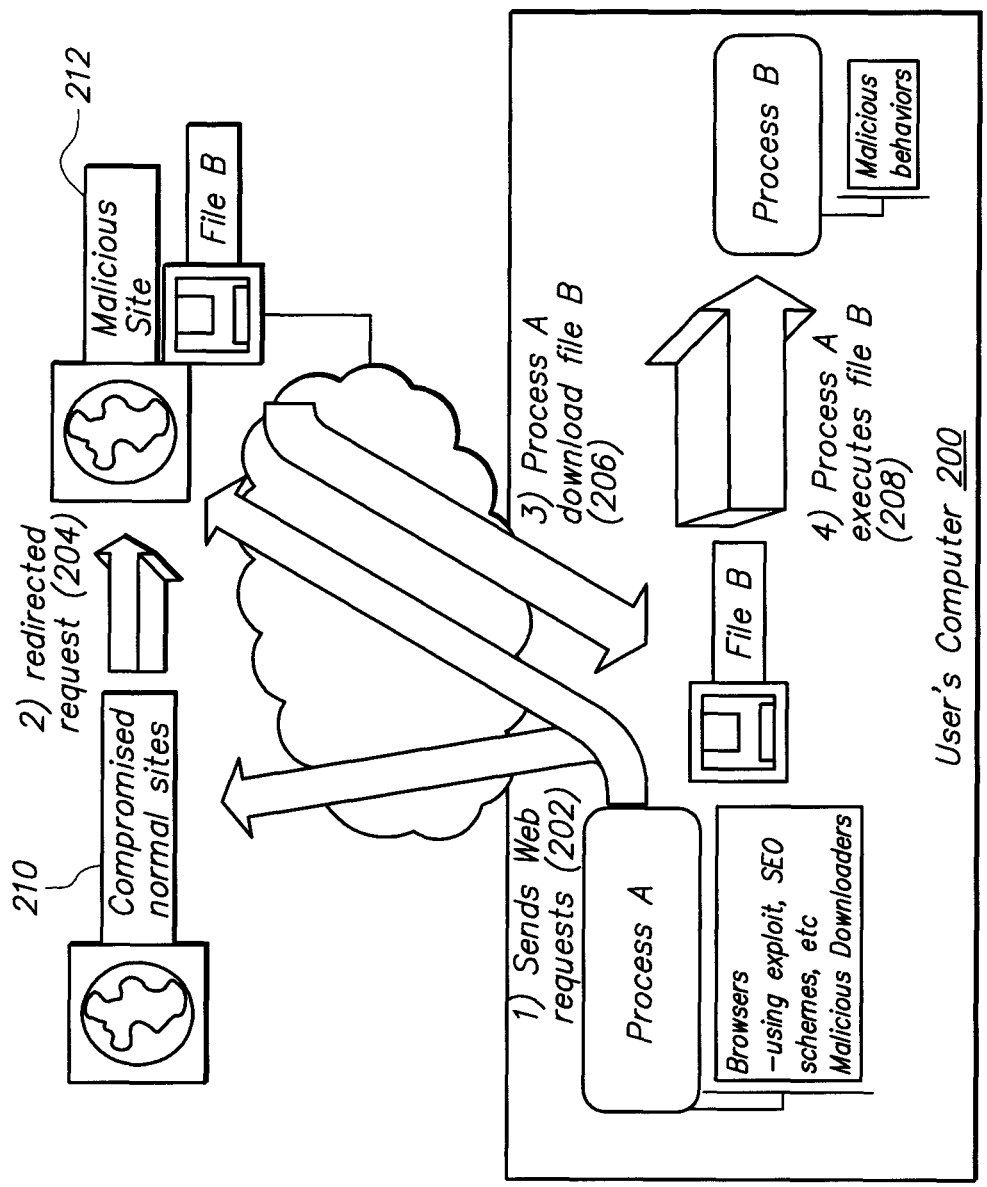
FIG. 2 is a diagram illustrating a typical drive-by download situation.

FIG. 2 is a diagram illustrating a typical drive-by download situation. For example, Process A shown in FIG. 2 may send Web requests 202 to download files for execution. While most "normal" sites may be fine, certain "normal" sites may be compromised, such that requests are redirected from compromised normal sites 210 to a malicious site 212. In that case, instead of downloading useful and harmless files (not shown) from the normal sites 210, a harmful File B is downloaded 206 from the malicious site 212 to the user's computer 200. Process A executes 208 File B, resulting in a malicious Process B being executed.

Figure 3:
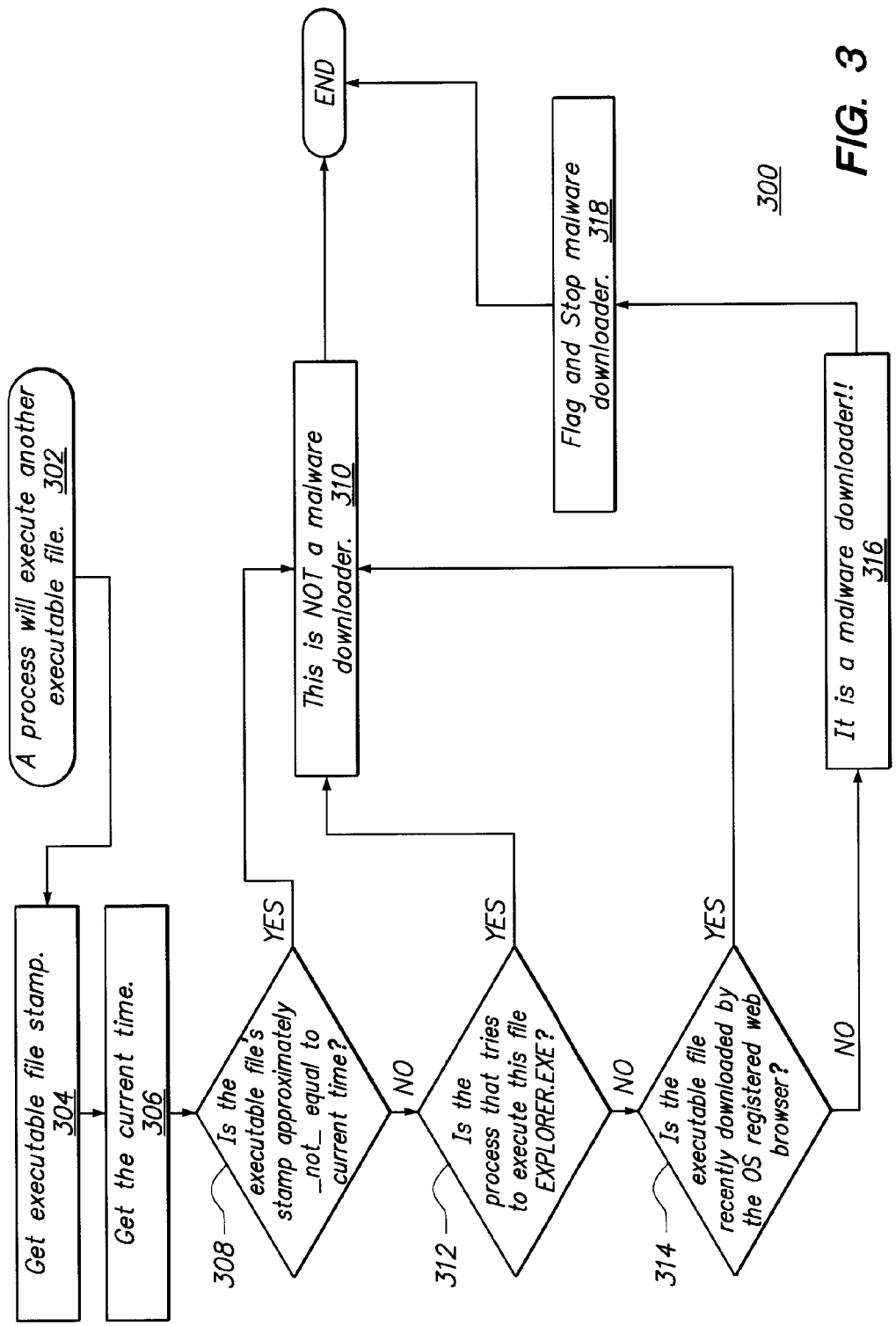
FIG. 3 is a flow chart of a method of malware downloader detection and prevention in accordance with an embodiment of the invention.

FIG. 3 is a flow chart of a method 300 of detecting and preventing malware downloaders in accordance with an embodiment of the invention. As shown in block 302, a process attempts to execute another executable file. As the term is used here, said process (or computer system process) is an instance of a computer program that is being executed by a computer system. The method 300 then performs various steps to determine whether or not said process is that of a malware downloader.

Per block 304, a timestamp for the executable file is obtained. This timestamp indicates the time at which the executable file was stored. Hence, if the executable file was downloaded from an online source, the timestamp indicates the time at which it was downloaded.

In addition, per block 306, the current time is obtained. The current time represents or indicates the time at which the process is attempting to run the executable file. Note that the order of steps 304 and 306 may be reversed (i.e. step 306 may be performed prior to step 304).

Thereafter, per block 308, a first determination is made. This first determination involves determining whether or not the executable file's timestamp (obtained in step 304) is approximately equal to (almost the same as) the current time (obtained in step 306). The current time may be deemed to be approximately equal to the time stamp if the current time is no more than a time period T after the time stamp. For example, T may be 5 minutes or more, or T may be an hour or more, or T may be a day or more.

If the timestamp is NOT approximately equal to the current time (i.e. the timestamp indicates that the file was downloaded or otherwise stored a long time before the current time), then a conclusion is reached, per block 310, that said process is NOT a malware downloader.

On the other hand, if the timestamp is approximately equal to the current time (i.e. the timestamp indicates that the file was downloaded or otherwise stored just before current time), then a second determination is performed. Per block 312, this second determination involves determining whether or not said process is a parent process of a "normal" program. In particular, for the Microsoft Windows® operating system, it is determined whether or not said process is EXPLORER.EXE. This is because EXPLORER.EXE is the parent process of a normal program in Windows®.

If said process is the parent process of a normal program (EXPLORER.EXE in Windows®), then a conclusion is reached, per block 310, that said process is NOT a malware downloader.

On the other hand, if said process is NOT the parent process of a normal program, then a third determination is performed per block 314. This third determination involves determining whether or not the executable file was recently downloaded by the OS (operating system) registered web browser.

If the executable file was recently downloaded by the OS registered web browser, then a conclusion is reached, per block 310, that said process is NOT a malware downloader.

Finally, if the executable file was NOT recently downloaded by the OS registered web browser, then it is determined per block 316, that said process is a malware downloader. Hence, per block 318, said process may then be flagged as a malware downloader, and the process may be stopped.

Note that the order of steps 312 and 314 may be reversed (i.e. step 314 may be performed prior to step 312). No matter the order, the conclusion 316 that said process is a malware downloader is reached only if the current time is approximately equal to the time stamp, and said process is not the parent process of a normal program, and the executable file was not downloaded by an OS-registered web browser.

The technique disclosed in the present patent application has various advantages and benefits. One benefit is that this technique will stop most web-threat attacks to a user's computer. This is because most recent web-threat attacks (for example, the LinkOptimizer attack, Italian Job 1 and 2 attacks, and so forth) used a malware downloader for its initial attack phase to infect user computers.

Another benefit is that this technique does not use signature patterns and so does not require constantly updating signature patterns. Hence, this technique reduces the usage of hard drive space (to store the signature patterns) and network bandwidth (to update the signature patterns).

This technique is advantageously a pro-active solution. It is capable of generically detecting and preventing malware downloaders. This is true even if the malware downloader is a new malware variant whose signature pattern is not yet determined.

In the present disclosure, numerous specific details are provided, such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of determining that a process running on a computer system is not a malicious web downloader, the method comprising:
   receiving an indication that a process running on the computer system is attempting to execute an executable file;
   obtaining a timestamp of the executable file, wherein the timestamp indicates a time at which the executable file was downloaded;
   obtaining a current time from the computer system;
   comparing the current time to the time indicated by the timestamp; and
   indicating that said process is not a malware downloader when the current time is more than a predetermined time period T after the time indicated by the timestamp.

2. The method of claim 1, wherein the predetermined time period T is at least five minutes.

3. The method of claim 1, wherein the predetermined time period T is at least one hour.

4. The method of claim 1, wherein the predetermined time period T is at least one day.

5. The method of claim 1, further comprising:
   determining whether said process is a parent process of a normal program; and
   if said process is the parent process of a normal program, then indicating that said process is not a malware downloader.

6. The method of claim 5, wherein the parent process of a normal program is EXPLORER.EXE.

7. The method of claim 5, further comprising:
determining whether the executable file was downloaded by an operating system registered web browser; and
if the executable file was downloaded by the operating system registered web browser, then indicating that said process is not a malware downloader that downloads and executes additional malware components of an infecting system.

8. The method of claim 7, further comprising:
indicating that said process is a malware downloader if the current time is no more than a predetermined time period T after the time indicated by the timestamp, and said process is not the parent process of a normal program, and if the executable file was not downloaded by the web browser.

9. A computer apparatus comprising:
data storage configured to store computer-readable instructions and data;
a processor configured to execute said computer-readable instructions;
computer-readable instructions stored in said data storage which are configured to receive an indication that a process running on the computer apparatus is attempting to execute an executable file, obtain a timestamp of the executable file, wherein the timestamp indicates a time at which the executable file was downloaded, obtain a current time from the computer apparatus;
computer-readable instructions stored in said data storage which are configured to compare the current time to the time indicated by the timestamp; and
computer-readable instructions stored in said data storage which are configured to indicate that said process is not a malware downloader when the current time is more than a predetermined time period T after the time indicated by the timestamp.

10. The computer apparatus of claim 9, wherein the predetermined time period T is at least five minutes.

11. The computer apparatus of claim 9, wherein the predetermined time period T is at least one hour.

12. The computer apparatus of claim 9, wherein the predetermined time period T is at least one day.

13. The computer apparatus of claim 9, further comprising:
computer-readable instructions stored in said data storage which are configured to determine whether said process is a parent process of a normal program, and
computer-readable instructions stored in said data storage which are configured to indicate that said process is not a malware downloader that downloads and executes additional malware components of an infecting system if said process is the parent process of a normal program.

14. The computer apparatus of claim 13, wherein the parent process of a normal program is EXPLORER.EXE.

15. The computer apparatus of claim 13, further comprising:
computer-readable instructions stored in said data storage which are configured to determine whether the executable file was downloaded by an operating system registered web browser; and
computer-readable instructions stored in said data storage which are configured to indicate that said process is not a malware downloader that downloads and executes additional malware components of an infecting system if the executable file was downloaded by the operating system registered web browser.

16. The computer apparatus of claim 15, further comprising:
computer-readable instructions stored in said data storage which are configured to indicate that said process is a malware downloader if the current time is approximately equal to the time indicated by the timestamp, and said process is not the parent process of a normal program, and if the executable file was not downloaded by the web browser.

* * * * *